US012637352B2

(12) United States Patent
Sichtermann et al.

(10) Patent No.: US 12,637,352 B2
(45) Date of Patent: May 26, 2026

(54) METHOD FOR STABLE OPERATION OF A STEAM REFORMING SYSTEM

(71) Applicants: thyssenkrupp Industrial Solutions AG, Essen (DE); thyssenkrupp AG, Essen (DE)

(72) Inventors: Ernst Sichtermann, Dortmund (DE); Ralph Piontek, Minden (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 1025 days.

(21) Appl. No.: 17/782,575

(22) PCT Filed: Nov. 23, 2020

(86) PCT No.: PCT/EP2020/083062
§ 371 (c)(1),
(2) Date: Jun. 3, 2022

(87) PCT Pub. No.: WO2021/110455
PCT Pub. Date: Jun. 10, 2021

(65) Prior Publication Data
US 2023/0017255 A1     Jan. 19, 2023

(30) Foreign Application Priority Data
Dec. 5, 2019    (DE) .................... 10 2019 218 972.5

(51) Int. Cl.
*C01B 3/34*          (2006.01)
*B01J 19/00*         (2006.01)
*B01J 19/24*         (2006.01)

(52) U.S. Cl.
CPC ............. *C01B 3/34* (2013.01); *B01J 19/0013* (2013.01); *B01J 19/004* (2013.01); *B01J 19/245* (2013.01);
(Continued)

(58) Field of Classification Search
CPC ............ B01J 19/245; B01J 2219/00157; B01J 2219/00186; B01J 19/0013; B01J 19/004;
(Continued)

(56) References Cited

U.S. PATENT DOCUMENTS 7,881,825 B2     2/2011 Esposito et al.
9,011,562 B2     4/2015 Polster et al.
(Continued)

FOREIGN PATENT DOCUMENTS

CA         1 076 641 A1     4/1980
DE    10 2010 020 406 A1    6/2011
(Continued)

OTHER PUBLICATIONS

Pala, Laxmi Prasad Rao, et al. âSteam Gasification of Biomass with Subsequent Syngas Adjustment Using Shift Reaction for Syngas Production: An Aspen plus Model.â Renewable Energy, vol. 101, Feb. 2017, pp. 484â492, https://doi.org/10.1016/j.renene.2016.08.069. (Year: 2016).*
(Continued)

*Primary Examiner* — Anthony J Zimmer
*Assistant Examiner* — Annette Phan
(74) *Attorney, Agent, or Firm* — thyssenkrupp North America, LLC

(57)          ABSTRACT

A method can be employed to regulate and stably operate a steam reforming system that is operated by steam reforming, that has a capacity utilization level that can be regulated, and that comprises a steam reformer, a hydrogenating and desulfurizing unit that is positioned upstream of the steam reformer and is configured for feedstock desulfurization, and a firing unit of the steam reformer. According to the method, a mandated capacity utilization level for the steam reforming system is established with automated regulation of the following continuously monitored parameter ratios: a hydro-
(Continued)

gen-to-feedstock ratio in the hydrogenating and desulfuriz-ing unit, a steam-to-carbon ratio in the steam reformer, and a fuel-to-air ratio in the firing unit of the steam reformer.

10 Claims, 2 Drawing Sheets

(52) U.S. Cl.
CPC ................. *B01J 2219/00157* (2013.01); *B01J 2219/00186* (2013.01); *C01B 2203/0233* (2013.01); *C01B 2203/0811* (2013.01); *C01B 2203/1258* (2013.01); *C01B 2203/169* (2013.01)

(58) Field of Classification Search
CPC ...... C01B 2203/0233; C01B 2203/169; C01B 2203/127; C01B 3/34; C01B 2203/0811; C01B 2203/1258; C01B 2203/1695; C01B 3/38; Y02P 20/129
USPC ......................................................... 263/373
See application file for complete search history.

(56) References Cited

U.S. PATENT DOCUMENTS

| | | | | |
|---|---|---|---|---|
| 11,274,039 | B2 * | 3/2022 | Chen | .......................... C01B 3/38 |
| 2008/0243310 | A1 | 10/2008 | Esposito et al. | |

FOREIGN PATENT DOCUMENTS

| | | | |
|---|---|---|---|
| EP | 2086874 | A1 | 8/2009 |
| JP | S59146904 | A | 8/1984 |
| JP | H09110401 | A | 4/1997 |
| WO | 2008/049505 | A1 | 5/2008 |

OTHER PUBLICATIONS

GroÃmann, Katharina, et al. âSteam Methane Reforming at Low S/c Ratios for Power-To-Gas Applications.â International Journal of Hydrogen Energy, vol. 41, No. 40, Oct. 1, 2016, pp. 17784â17792, https://doi.org/10.1016/j.ijhydene.2016.08.007. (Year: 2016).*
English Translation of International Search Report issued in PCT/EP2020/083062, dated Feb. 4, 2021.

* cited by examiner

METHOD FOR STABLE OPERATION OF A STEAM REFORMING SYSTEM

CROSS REFERENCE TO RELATED APPLICATIONS

This application is a U.S. National Stage Entry of International Patent Application Serial Number PCT/EP2020/083062, filed Nov. 23, 2020, which claims priority to German Patent Application No. DE 10 2019 218 972.5, filed Dec. 5, 2019, the entire contents of both of which are incorporated herein by reference.

FIELD

The present disclosure generally relates steam reformers, including methods for regulating and stably operating steam reforming systems whose capacity utilization level can be regulated.

BACKGROUND

In view, for example, of the globally rising demand for hydrogen, production capacities are being continuously expanded, and the methods for hydrogen production are being optimized in their efficiency. One efficient and therefore also widespread technique for producing hydrogen is that of steam reforming, in which hydrogen is produced from hydrocarbons such as, for example, from natural gas, naphtha (crude oil, straight-run gasoline), LPG, hydrogen-rich off-gases such as refinery off-gases, biomass or crude oil.

Steam reforming here is typically embedded into the following operating chain:

The steam reforming itself is commonly preceded by feedstock preparation, which entails, for example, the compression or vaporization or preheating of the feedstock. This is commonly followed by two-step feedstock desulfurization, in which olefins, as well as organic sulfur compounds contained in the feedstock are hydrogenated in a hydrogenating unit. The sulfur, now present in the form of $H_2S$, is subsequently adsorbed on zinc oxide, for example.

Following feedstock preparation, the entire quantity of process steam required for the subsequent catalytic steps is added, for example. The addition is made at a defined molar ratio. The ratio is formed from the organic carbon contained in the feedstock stream and from the process steam flow rate.

Before the actual steam reforming takes place, it is possible, for reasons of minimization of the feedstock and fuel consumption and also of minimization of the size of the steam reformer, to carry out preliminary reforming in an adiabatic reactor, the subject of this preliminary reforming being the conversion of heavy hydrocarbons into methane, hydrogen, carbon monoxide and carbon dioxide at about 450 to 540° C.

The actual steam reforming for obtaining hydrogen in a steam reformer proceeds at about 500 to 930° C. and is accomplished in an endothermic reaction between hydrocarbon, methane for example, and steam:

$$CH_4+H_2O \Leftrightarrow CO+3H_2$$

For saturated hydrocarbons, this can be written in a general form as follows:

$$C_nH_m+nH_2O \Leftrightarrow nCO+(m/2+n)H$$

In order to boost the hydrogen yield, this reaction is followed possibly, and commonly in the case of a plant for hydrogen generation, by a reaction referred to as the water-gas shift reaction, in which carbon monoxide and steam react to form carbon dioxide and hydrogen:

$$CO+H_2O \Leftrightarrow CO_2+H_2$$

Lastly, the synthesis gas leaving the steam reformer is cooled to a temperature suitable for the pressure swing adsorption plant. In the pressure swing adsorption plant, impurities such as CO, $CO_2$, $H_2O$, $N_2$ and $CH_4$ are effectively separated off, and high-purity hydrogen is obtained. For reasons of efficiency, the waste heat arising is recovered. Steam produced from waste heat is re-used as process steam, with any excess being delivered, for example, to an existing network.

Known from U.S. Pat. No. 7,881,825 B2 is a method for operating a hydrogen production system on the basis of steam reforming, the method making it possible, through algorithms and elaborate correction models, to operate the hydrogen production system at an operating point as close as possible to the optimum, in order to minimize the consumption of feedstock, while the hydrogen yield is to be maximized.

The requirements imposed on a method for operating a hydrogen production system or, generally, a steam reforming system, however, do not simply amount to discovering the operating point that is optimized for feedstock consumption. Instead, a method of this kind ought likewise to enable the level of capacity utilization of the system to be adapted to scenarios of fluctuating product demand and/or hydrogen demand. Another requirement imposed on the system is that stable operation thereof is ensured in spite of a variable capacity utilization level, and hence in spite of a changeable demand for product and/or hydrogen. The criterion of system stability—by no means trivial in light of the complexity of the processes operating and system constituents involved—is of particular importance because hydrogen production systems, like many large-scale chemical plants, are necessarily equipped with an emergency shutdown system, which intervenes in the event, for example, of fluctuations in quantities, pressure and temperature that result from changes in load and that lead to mandated safety-relevant system limit values being exceeded, and shuts off the hydrogen production system as a whole. System shut off entails considerable downstream costs, which may significantly negatively impact the overall productivity of a plant, and so a single system shutdown is often associated with higher costs than are slight deviations from the optimum operating point in relation to feedstock consumption in normal operation.

Thus a need exists for a method for regulating and for stably operating a steam reforming system whose capacity utilization level can be regulated, said method taking over the regulation of the capacity utilization level and at the same time guaranteeing a high degree of stability in system operation—especially during changes in the capacity utilization level.

Some examples of the present disclosure involve a method where a mandated capacity utilization level of the production system is established with automated regulation of the following continuously monitored parameter ratios:

hydrogen-to-feedstock ratio in the hydrogenating and desulfurizing unit, steam-to-carbon ratio in the steam reformer, fuel-to-air ratio in the firing unit of the steam reformer.

DETAILED DESCRIPTION

Figure 1:
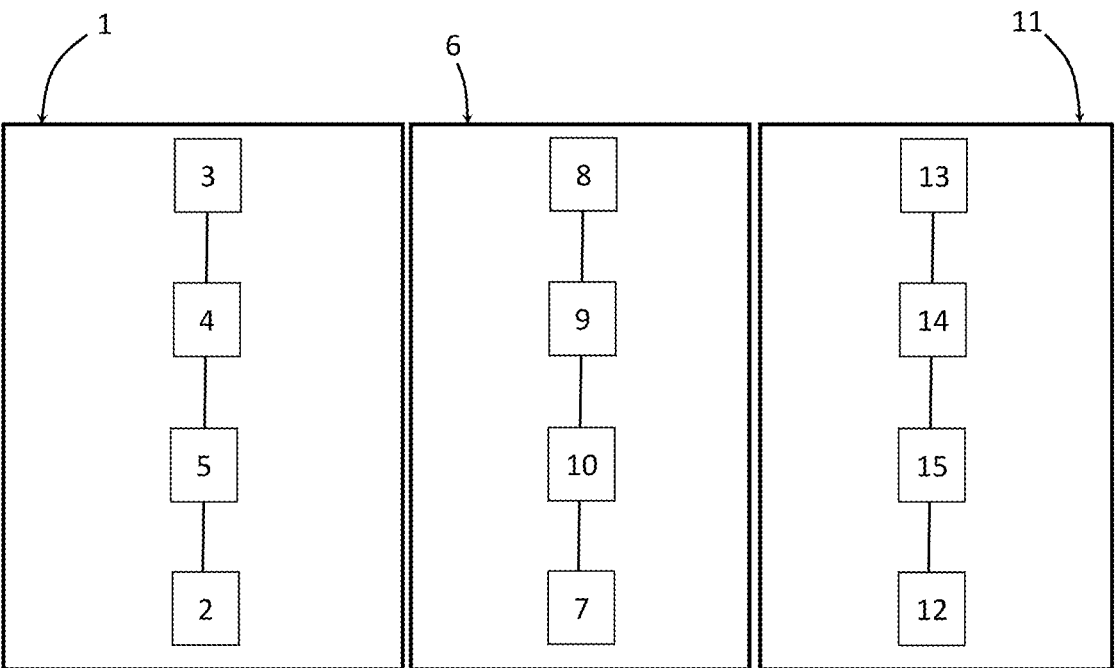
FIG. 1 is a schematic view illustrating an example method of the present disclosure in the case of a rising capacity utilization level.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for regulating and for stably operating a steam reforming system whose capacity utilization level can be regulated. In some instances, the steam reforming system may comprise a steam reformer, a hydrogenating and desulfurizing unit positioned upstream of the steam reformer and intended for feedstock desulfurization, and a firing unit of the steam reformer.

With this method, in a first step—even before entry of the gases involved into the steam reformer it is ensured, in order to protect the catalyst located in the steam reformer from sulfur compounds that act as a catalyst poison, in a preparatory step, that the feedstock is supplied with a sufficient amount of hydrogen in order to carry out effective hydrogenation, of organic sulfur compounds and olefins, for example, in the hydrogenating unit positioned upstream of the steam reformer. With the method of the invention, this can be achieved, for example, in an advantageous way by drawing off a small substream of the hydrogen generated by the steam reforming and supplying it to the feedstock stream in a specific ratio. The current hydrogen-to-feedstock ratio is monitored continuously and the respective input variables— in the present case hydrogen stream and feedstock stream— are regulated accordingly.

The hydrogen-to-feedstock ratio that is selected in this step, with this method, is preferably dependent on the feedstock. With particular preference a hydrogen-to-feedstock ratio is adjusted on the basis of the molar flow rates in the range from 0.01 to 0.60.

After the conclusion of this preparatory step, prepared feedstock is available for the subsequent steam reforming.

In a second step of the method of the invention, for the efficient implementation of the steam reforming, i.e. the endothermic reaction of hydrocarbons with steam, the steam-to-carbon ratio is monitored by suitable measuring apparatus, by means of flow meters and feedstock analysis, for example, and is adjusted by regulation of the steam stream and/or of the desulfurized feedstock stream. The steam stream is preferably selected in a form adapted to the desulfurized feedstock stream which is obtained from the hydrogenating and desulfurizing unit and which enters the steam reformer.

The feedstock stream already prepared in the first step can be considered as being unchanged in the course of the preparatory procedure, since the sulfur compounds removed from the feedstock stream commonly have a fraction of only a few ppm. With particular preference, on the addition of process steam, a molar steam-to-carbon ratio of 2.0 to 4.0 is established.

The last step in the method of the invention comprises the monitoring and establishment of a fuel-to-air ratio in the firing unit associated with the steam reformer, said unit introducing the heat required for the endothermic reaction, through combustion of the fuel. The selected fuel-to-air ratio in this case is dependent on feedstock and on fuel.

It has emerged that the stability of operation of the system can be additionally improved if, in the event of changes to the capacity utilization level of the system, the hydrogen-to-feedstock ratio is regulated such that the sequence of the adjustment of the hydrogen stream and of the feedstock stream, in the first step, serving for preparation of the feedstock, is selected as a function of whether the capacity utilization level of the steam reforming system is being raised or lowered.

In a particularly favourable way in terms of improving the stability of operation of the system, the steam-to-carbon ratio that is relevant to the steam reforming is regulated, in the event of changes to the capacity utilization level of the system, such that the sequence of the adjustment of the steam stream and of the feedstock stream, in a development of the method of the invention, is selected as a function of whether the capacity utilization level of the steam reforming system is being raised or lowered.

The stability of operation of the system can be further improved by regulating the fuel-to-air ratio, in the event of changes to the capacity utilization level of the system, in such a way that the sequence of adjustment of the fuel stream and of the air stream is selected as a function of whether the capacity utilization level of the steam reforming system is being raised or lowered.

It has emerged, furthermore, that the application of the method of the invention is particularly useful if the capacity utilization level of the steam reforming system is in the range from 30% to 100%, which ought commonly to be a desire on economic grounds. At low capacity utilization levels (below 30%), as a result of the presence of non-continuous partial loads, non-equilibrium states may arise, and may cause instabilities in operation of the system. With a capacity utilization level of 30% to 100%, the hydrogen production plant, with its entirety of the individual plant parts, is typically within a range of stable, continuous operation in which the method of the invention operates particularly well, and so the likelihood of unwanted shutdown of the plant as a consequence of changes in the capacity utilization level is effectively minimized.

In the context of the method of the invention, moreover, it has emerged as being advantageous to system stability if the rate of change of the capacity utilization level is limited to 0.5% to 2.0% of the feedstock quantity per minute that is required for 100% capacity utilization. This rate of change can also be transposed in a good approximation to all other parameters and/or streams that are to be changed. Higher rates of change carry the risk of excessive fluctuations in quantities, pressure and temperature, leading possibly to mandated safety-relevant system limit values being exceeded. The rate of change referred to here represents a preferred value, with which the change in the capacity utilization level is achieved speedily but while maintaining the stable operation of the system.

FIG. 1 represents a working example of the method of the invention, in which a steam reforming system is regulated in the case of a rising capacity utilization method and hence a rising production of hydrogen, where the sequence of the changes of the respective variables is also taken into account in order to improve further the stability of operation of the system.

In one step the feedstock is prepared by hydrogenation in the hydrogenating stage and thereafter in the desulfurizing unit 1, by implementation of the hydrogenation at a specific hydrogen-to-feedstock ratio 2. In order to establish this feedstock-dependent ratio, the setpoint values of the hydrogen stream and of the feedstock stream, 3, are calculated as a function of the mandated capacity utilization level, which is typically raised on the user side (for example, manually or on the basis of the product delivery pressure). First of all the hydrogen stream is adjusted 4. This is followed by adjustment of the feedstock stream 5, in order to preserve the desired hydrogen-to-feedstock ratio. The hydrogen stream 4 is therefore adjusted in advance of the adjustment of the feedstock stream 5. Adjustment of the feedstock stream 5 here preferably begins before the setpoint value of the hydrogen stream has been reached. In this way the desired hydrogen-to-feedstock ratio 2 is established.

In a further step, in the steam reformer 6, the setpoint values of the steam stream and of the carbon stream 8 for the target capacity utilization level are first calculated, before entry into the steam reforming procedure, in order to ensure the proper functioning thereof, by establishment of a specific steam-to-carbon ratio 7. The amount of the carbon carried in by the feedstock here may be ascertained on the basis of its molar mass fraction in the feedstock, through suitable measurements—for example, a gas chromatography measurement, or by sampling and evaluation in the laboratory. Subsequently, the calculated steam stream 9 first, and thereafter the corresponding feedstock stream 10 for establishing the desired ratio, are adjusted. The steam stream 9 is therefore adjusted in advance of the adjustment of the feedstock stream 10. The adjustment of the steam stream 9 here begins preferably before the setpoint value of the feedstock stream 10 has been reached.

In order to ensure that the prescribed sequence is observed, provision may be made to calculate a time profile for the setpoint values of the feedstock streams and steam streams to be introduced into the steam reformer, as a function of the time profile of the feedstock stream in the hydrogenating and desulfurizing unit and of a system-specific transit time between the hydrogenating and desulfurizing unit and the steam reformer.

In a third step, in the firing unit 11 of the steam reformer 6, a specific fuel-to-air ratio 12 is established as a function of the capacity utilization level, by first calculating the setpoint values of the air stream and fuel stream 13. Subsequently, the calculated air stream 14 first, and thereafter the corresponding fuel stream 15 for establishing the desired ratio, are adjusted.

Figure 2:
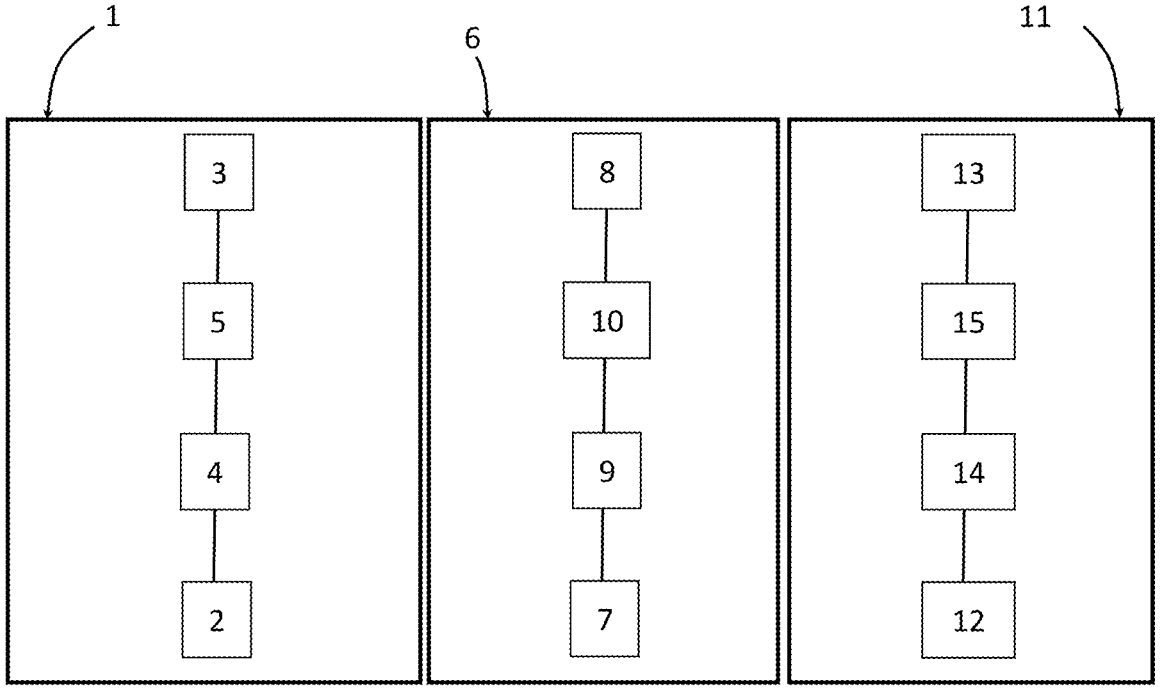
FIG. 2 is a schematic view illustrating an example method of the present disclosure in the case of a falling capacity utilization level.

FIG. 2 describes the case, opposite to that of FIG. 1, of a falling capacity utilization level or a falling hydrogen production. It is essential here that the sequence of the adjustments to the respective streams is switched in comparison to the case shown in FIG. 1, in order to achieve the target degree of system stability.

It would be appreciated that the method steps described in the context of the working examples, concerning the sequence of the changing of the streams, can be employed not only in the entirety described (that is, in all three method steps), but also only in one or two of the three method steps described, with the application of all the method steps being preferred in terms of the assurance of system stability.

6

LIST OF REFERENCE NUMERALS

1 Hydrogenating and desulfurizing unit
2 Hydrogen-to-feedstock ratio
3 Setpoint values of the hydrogen stream and the feedstock stream
4 Adjustment of the hydrogen stream
5 Adjustment of the feedstock stream
6 Steam reformer
7 Steam-to-carbon ratio
8 Setpoint values of the steam stream and the carbon stream
9 Adjustment of the steam stream
10 Adjustment of the feedstock stream
11 Firing unit
12 Fuel-to-air ratio
13 Setpoint values of the air stream and fuel stream
14 Adjustment of the air stream
15 Adjustment of the fuel stream

What is claimed is:

1. A method for regulating and stably operating a steam reforming system whose capacity utilization level is regulatable, with the steam reforming system comprising a steam reformer, a hydrogenating and desulfurizing unit positioned upstream of the steam reformer and configured for feedstock desulfurization, and a firing unit of the steam reformer, the method comprising:

establishing a mandated capacity utilization level for a production system with automated regulation of the following continuously monitored parameter ratios:
a hydrogen-to-feedstock ratio in the hydrogenating unit;
a steam-to-carbon ratio in the steam reformer; and
a fuel-to-air ratio in the firing unit of the steam reformer;
calculating setpoint values for molar flow rates of a hydrogen stream and a feedstock stream to be introduced into the hydrogenating and desulfurizing unit, wherein the setpoint values produce a desired hydrogen-to-feedstock ratio as a function of the mandated capacity utilization level;
raising the capacity utilization level of the steam reforming system by initiating adjustment of a molar flow rate of the hydrogen stream to the respective setpoint value in advance of the feedstock stream; and
lowering the capacity utilization level of the steam reforming system by initiating adjustment of a molar flow rate of the feedstock stream to the respective setpoint value in advance of the hydrogen stream.

2. The method of claim 1 comprising adjusting the hydrogen-to-feedstock ratio based on the molar flow rates of the hydrogen stream and the feedstock stream to a value in a range from 0.01 to 0.60.

3. The method of claim 1 comprising:
for a steam stream and a feedstock stream, calculating setpoint values that produce the desired steam-to-carbon ratio as a function of the mandated capacity utilization level;
adjusting the steam stream to the respective setpoint value in advance of the feedstock stream to raise the capacity utilization level of the steam reforming system; and
adjusting the feedstock stream to the respective setpoint value in advance of the steam stream to lower the capacity utilization level of the steam reforming system.

4. The method of claim 1 comprising adjusting the steam-to-carbon ratio based on molar flow rates to a value in a range from 2.0 to 4.0.

5. The method of claim 1 comprising determining an amount of carbon carried by a feedstock into the steam reformer based on its molar mass fraction in the feedstock.

6. The method of claim 1 comprising determining an amount of carbon carried by a feedstock into the steam reformer based on a gas chromatography measurement or based on sampling and evaluation.

7. The method of claim 1 comprising:

for an air stream and a fuel stream, calculating setpoint values that produce the desired fuel-to-air ratio as a function of the mandated capacity utilization level;

adjusting the air stream to the respective setpoint value in advance of the fuel stream to raise the capacity utilization level of the steam reforming system; and adjusting the fuel stream to the respective setpoint value in advance of the air stream to lower the capacity utilization level of the steam reforming system.

8. The method of claim 1 wherein the capacity utilization level of the steam reforming system is 30% to 100%.

9. The method of claim 1 comprising changing at least one of the continuously monitored parameter ratios with defined permissible rates of change.

10. The method of claim 1 comprising calculating a time profile for a setpoint value of a steam stream to be introduced into the steam reformer as a function of a time profile of a feedstock stream in the hydrogenating and desulfurizing unit and as a function of a system-specific transit time between the hydrogenating and the sulfurizing unit and the steam reformer, and introducing the steam stream into the steam reformer in accordance with the calculated time profile for the setpoint value.

* * * * *